United States Patent [19]

Siemer et al.

[11] Patent Number: 5,933,213

[45] Date of Patent: Aug. 3, 1999

[54] APPARATUS AND METHOD FOR IMPARTING A SUCCESSION OF PREDETERMINED LATENT IMAGES ON A STRIP OF UNEXPOSED LIGHT SENSITIVE FILM

[75] Inventors: Michael S. Siemer, Weatherford; Tommy A. Eddings, Mustang, both of Okla.

[73] Assignee: Imation Corp., Oakdale, Minn.

[21] Appl. No.: 08/534,048

[22] Filed: Sep. 26, 1995

[51] Int. Cl.[6] .................................................. G03B 27/52
[52] U.S. Cl. ............................................ 355/40; 396/318
[58] Field of Search ................................ 355/27, 39, 40; 396/310, 315, 316, 318

[56] References Cited

U.S. PATENT DOCUMENTS

| | | | |
|---|---|---|---|
| 4,367,924 | 1/1983 | Clark et al. | 350/334 |
| 4,544,259 | 10/1985 | Kanaoka et al. | 355/1 |
| 4,548,492 | 10/1985 | Kanaoka et al. | 355/50 |
| 4,563,059 | 1/1986 | Clark et al. | 350/330 |
| 4,634,226 | 1/1987 | Isogai et al. | 350/332 |
| 4,701,026 | 10/1987 | Yazaki et al. | 350/333 |
| 4,793,693 | 12/1988 | Shimoda et al. | 350/350 S |
| 4,806,965 | 2/1989 | Yamanouchi et al. | 355/1 |
| 4,830,468 | 5/1989 | Stephany et al. | 350/336 |
| 4,884,095 | 11/1989 | Yamanouchi et al. | 355/1 |
| 4,886,619 | 12/1989 | Janulis | 252/299.1 |
| 4,918,484 | 4/1990 | Ujiie et al. | 355/41 |
| 4,965,628 | 10/1990 | Olliver et al. | 355/41 |
| 4,975,729 | 12/1990 | Gordon | 355/1 |
| 5,029,987 | 7/1991 | Shinomiya | 350/340 |
| 5,062,691 | 11/1991 | Tristani-Kendra et al. | 359/56 |
| 5,082,587 | 1/1992 | Janulis | 252/299.01 |
| 5,128,519 | 7/1992 | Tokuda | 235/375 |
| 5,179,266 | 1/1993 | Imamura | 235/375 |
| 5,262,082 | 11/1993 | Janulis et al. | 252/299.01 |
| 5,274,396 | 12/1993 | Shimoda et al. | 346/107 |
| 5,294,950 | 3/1994 | DuVall et al. | 354/109 |
| 5,307,108 | 4/1994 | Yamanouchi et al. | 354/354 |
| 5,327,263 | 7/1994 | Katagiri et al. | 358/471 |
| 5,336,873 | 8/1994 | Imamura | 235/462 |
| 5,365,356 | 11/1994 | McFadden | 359/62 |
| 5,390,000 | 2/1995 | Tanibata | 355/71 |

FOREIGN PATENT DOCUMENTS

| | | | |
|---|---|---|---|
| 0 331 049 | 6/1989 | European Pat. Off. | G06K 7/10 |
| 0 405 868 | 2/1991 | European Pat. Off. | C09K 19/42 |

OTHER PUBLICATIONS

Meyer, R.B., et al., "Ferroelectric Liquid Crystals", *Journal de Physique—Lettres*, vol. 36, Mar. 1975, pp. L–69—L–70.

Ouchi, Yukio, et al., "Smectic Layer Structure of Thin Ferroelectric Liquid Crystal Cells Aligned by SiO Oblique Evaporation Technique", *Japanese Journal of Applied Physics*, vol. 27, No. 11, Nov. 1988, pp. L1993–L1995.

Reiker, T.P. et al., ""Chevron" Local Layer Structure in Surface–Stabilized Ferroelectric Smectic–C Cells", *Physical Review Letters*, vol. 59, No. 23, Dec. 7, 1987, pp. 2658–2661.

(List continued on next page.)

*Primary Examiner*—Safet Metjahic
*Assistant Examiner*—John Chizmar
*Attorney, Agent, or Firm*—William D. Bauer

[57] ABSTRACT

Apparatus and method for imparting a succession of predetermined machine readable latent images on a strip of unexposed light sensitive film having a series of frames, the succession of latent images being individually indicative each of the series of frames of the film. A light source is adapted to be controlled at a rate associated for a particular type of film, the light source produces imaging light to which the film is sensitive. A ferroelectric liquid crystal array receives the imaging light, the ferroelectric liquid crystal array having a plurality of segments, each of the plurality of segments being individually switchable between opaque and transparent, the plurality of segments being formed so that the ferroelectric liquid crystal array can produce all of the predetermined latent images. Focusing means for focuses the imaging light which has passed through the ferroelectric liquid crystal array onto the strip of light sensitive film.

16 Claims, 7 Drawing Sheets

OTHER PUBLICATIONS

Reiker, T.P., et al., "Chevron Layer Structures in Surface Stabilized Ferroelectric Liquid Crystal (SSFLC) Cells Filled with a Material Which Exhibits the Chiral Nematic to Smectic C* Phase Transition", *Ferroelectrics*, vol. 113, 1991, pp. 245–256.

Clark, Noel A., et al., "Submicrosecond Bistable Electro–Optic Switching in Liquid Crystals", *Appl. Phys. Lett. 36 (11)*, 1980 American Institute of Physics, Jun. 1, 1980, pp. 899–901.

APPARATUS AND METHOD FOR IMPARTING A SUCCESSION OF PREDETERMINED LATENT IMAGES ON A STRIP OF UNEXPOSED LIGHT SENSITIVE FILM

TECHNICAL FIELD

The present invention relates generally to apparatus and method for imparting latent images on light sensitive film and, more particularly to such apparatus and methods which are capable of printing such latent images which are indicative of an individual one of a plurality of frames of the light sensitive film.

BACKGROUND OF THE INVENTION

In the manufacture of photosensitive products such as photographic film, paper or the like, it is well known to provide a film with latent images of characters, numerals, symbols, marks the like which are later photographically developed during the processing of the exposed film, for providing information marks such as the manufacturer's name, the date, the film type, frame numbers, frame size and the like along the longitudinal sides or margins of the film. One way of so marking a film, which is generally called side printing, is to optically form light images of characters on the film at the longitudinal margins adjacent each picture frame during the film manufacture, the film being thereby produced with latent images of characters, which characters are later photographically developed during the processing of the exposed film.

Apparatus for producing a film with such latent images of characters as aforementioned, which is generally called side printing apparatus, are well known. Such apparatus are divided into four types in accordance with the forms of the light providing mechanism. One form is a projection mechanism in which a character pattern plate and a light source for illuminating the pattern plate are used to form light images of characters. Another form is a light emitting diode (LED) matrix array in which a plurality of LEDs are selectively energized to form light images of characters. A third form is a liquid crystal display device in combination with light source. A fourth form is a cathode ray tube (CRT) display device.

Such side printing apparatus can be constructed so that the light images are formed in synchronism with the motion of the film in a forward direction by detecting the moved length of the film so as to provide latent images in the film at predetermined positions, and the interval for which the light image forming device is maintained energized is varied according to changes in the speed of motion of the film for the purpose of producing positive images of characters of uniform density.

An example of an apparatus to provide latent images containing information regarding film type and frame number on unexposed photographic film is U.S. Pat. No. 4,965,628, Oliver et al, Photographic Film with Latent Image Multi-Field Bar Code and Eye-Readable Symbols, (Eastman Kodak Company), discloses a multi-field latent image bar code photographically recorded every half frame of a strip of photographic film. One of the fields represents information pertaining to the film and another of the fields represent the half-frame number. Also, U.S. Pat. No. 5,179,266, Imamura, Photographic Film and Method of Identifying Frame Numbers of Photographic Film, and U.S. Pat. No. 5,336,873, Photographic Film Having Frame Number Bar Codes, (both Fuji Photo Film Co., Ltd.), disclose a photographic film provided with bar codes indicating frame numbers attached to respective frames.

Such latent images containing film and frame information are optically printed aside the respective exposable frames of negative photographic film during manufacturing of the film. Such information may be contained in bar codes or other machine readable format. Apparatus capable of printing latent images on unexposed photographic film can use several different techniques to provide the latent image.

Conventional apparatus to perform this function use a "chrome on glass pattern plate" which is then illuminated by a light source for an appropriate exposure period based upon the speed of the film and other factors. While such a system provides excellent quality, the fixed nature of the "pattern plate" makes changing the desired pattern to be imaged, e.g., changing between film types and sizes, a cumbersome process. Type 135 film (thirty-five millimeter width) typically contains individual frame numbers, some of which are represented in bar code format. Further, with the advent of including frame number information in the latent information printed on the unexposed light sensitive film, the "pattern plate" would have be changed every frame of the strip of film. This makes this method impractical.

Another technique is to use a plastic photo-sensitive material to make a plastic mask which is the length of the exposure wrapped around a vertical drum having a circumference at least equal to the length of one piece of film. A light source in the center of the drum exposes the film to the information contained on the plastic mask as the drum rotates and the film moves horizontally. Unfortunately, the plastic mask deteriorates rapidly and produces a relatively poor image quality. Not only must the entire mask must be changed when the desired pattern to be imaged changes but the drum might need to be changed (different circumference) or the drum's mechanical drive system may have to change for different film lengths.

Other apparatus attempt to solve this problem by providing a more changeable method for forming the information to be latent printing on the unexposed light sensitive film. An example is U.S. Pat. No. 4,548,492, Kanaoka et al, Side Printing Apparatus, (Fuji Photo Film Co., Ltd.), which discloses a side printing apparatus which provides latent images of characters, numerals, symbols and the like on a continuously moving film. Such latent images are then later developed. The light images may be formed by (1) projection from a character plate, (2) a light emitting diode array, (3) liquid crystal display in conjunction with a light source, and (4) cathode ray tube (CRT) display device. The apparatus shuts the imaging system off during reverse movement of the film in order to prevent double exposures.

Examples of such apparatus that utilize light emitting diodes and light emitting diode arrays are U.S. Pat. No. 5,274,396, U.S. Pat. No. 4,806,965, and U.S. Pat. No. 5,307,108.

U.S. Pat. No. 5,274,396, Shimoda et al, Bar Code Printing Apparatus, discloses a bar code printing apparatus which uses an LED driver (27) for selectively lighting an LED array (28) in accordance with print pattern data. Light emanating from each LED array is transmitted by way of a flexible light guide (31) in the form of a large, bulky and expensive fiber bundle comprising a considerably great number of optical fibers toward the film. The light in the form of a small dot from the light guide is focused on a margin of the film so as to create a latent image of a small dot. An LED driver (27) selectively lights the LED array to form a light pattern of a numeral or a bar code of the film traveling at a constant speed. This technique provides overlapping areas which will have more exposure than others preventing a homogeneous exposure.

U.S. Pat. No. 4,806,965, Yamanouchi et al, and U.S. Pat. No. 4,884,095, Yamanouchi et al, both entitled Apparatus for Writing Data Onto Photosensitive Film, (Konica Corporation), disclose an apparatus for optically writing data onto non-exposed film coated with photosensitive material while moving the film in a predetermined direction. The data can represent film frame number. The apparatus uses two groups of multi-color light emitting diodes being arranged with a pitch in parallel two lines beings crossing at right angles to a film processing direction. Two columns of light emitting diodes are used with the second column shifted down by half a pixel allowing the second column of light emitting diodes to fill in the gap between pixels of the first column of light emitting diodes. This technique, also used by dot matrix printers, also provides overlapping areas which will have more exposure than others preventing a homogeneous exposure.

U.S. Pat. No. 5,307,108, Yamanouchi et al, Film Data Exposure Device, (Konica Corporation), discloses an apparatus for forming a latent image of an identification data in an edge portion of a new photosensitive film. The apparatus uses light sources LEDs (25) which is sent by an optical fiber (23) via optical fiber head (28) an lens (29) to form an image on the film. Alternatively, the apparatus uses a light source (204) and a lens (205) to expose the film.

Light guides are also used in U.S. Pat. No. 4,544,259, Kanaoka et al, Side Printing Apparatus, (Fuji Photo Film Co., Ltd.), which discloses a printing apparatus for printing a colored mark in a colored dot pattern seven pixels high using light emitting diodes on a colored light sensitive material which is moving. Light guides are used to guide light from a plurality light sections, each light section being illuminated by a plurality of light sources of different colors.

Systems using light emitting diode arrays are relatively slow due to the period of time that it takes for the light emitting diodes to change state and due to the amount of light produced. Exposure time is important in a manufacturing process such as this because the exposure time may limit the speed at which the film can be processed during manufacture. The longer the exposure time, the slower the film must be processed to avoid blurring. These devices are also cumbersome, complex and expensive due to the necessity of having coherent fiber bundles to channel light from the light emitting diodes to the film being exposed. Images formed with fiber bundles typically depend on a precision mechanical drive system to keep film motion constant. If the film wavers during imaging, then the resulting image will be wavy.

Several apparatus are known which can read such frame-identifying indicia during the making of a photographic print from a developed strip of photographic film.

An example of such a bar code reading apparatus is disclosed in European Patent Application No. 0 331 049, Saeki et al, in the name of Fuji Photo Film Co., Ltd. Saeki et al discloses an apparatus for reading bar code of photographic film. Two bar code sensors (8, 9) are disposed at opposite sides of a passage of a photographic film (2), each bar code sensor having first and second photosensor arrays. These photosensor arrays are disposed so as to be located at the passages of the clock track and the data track, respectively, along the line perpendicular to the transportation direction of the photographic film. The DX bar code data (5) and the frame number bar code data (4) are automatically discriminated (read) based on the bar code data configuration read out with the bar code sensor units.

Another example of such a bar code reading apparatus is disclosed in U.S. Pat. No. 5,128,519, Tokuda, Method for Detecting and Positioning Frame Numbers in a Photographic Film, discloses a method of identifying frame numbers of photographic film having both decimal numbers and bar codes both representative of serial frame numbers. When a sensor reads a bar code, measurement of the advanced length of a photographic film is started to obtain a distance of either the bar code or the decimal number relative to the sensor. After the positioning of a frame to be printed in a film framing mask at the printing station, a frame number represented by a decimal number or bar code whose moved distance is within a predetermined range of distances is drawn, thereby identifying the picture frame in the framing mask to have the drawn frame number. FIG. 3 discloses a photographic printer which reads bar code information from color negative film (2) which is indicative of the frame number of the negative to be printed. An illumination lamp (10) passes, optionally, through color filters (11, 12 or 13), through a mixing box (14) before passing through color negative film (2). The light is focused in printing lens (36) on a color photographic paper (37) under control of shutter (39).

U.S. Pat. No. 4,918,484, Ujiie et al, Picture Frame Number Discriminating Method and Apparatus Therefor, (Fuji Photo Film Co., Ltd.), discloses a method and apparatus which discriminates (reads) numerical frame numbers and corresponding coded frame numbers and determines the measurement between the center of the film frame mask and the read frame number.

U.S. Pat. No. 5,390,000, Tanibata, Exposure Apparatus Including PLZT Optical Shutter, (Noritsu Koki Co., Ltd.), also discloses an exposure apparatus used during the processing of exposed negative film in order to print an image contained in the negative film. In so doing, it is preferable to be able to print information regarding the image adjacent the print being made. The apparatus achieves 100% light shielding from the information being printed when closing a PLZT optical shutter even if a light source associated with such information remains turned on.

While these apparatus read bar code, or other machine readable indicia, from a strip of developed photographic film, these apparatus also may print an indicia, usually human readable, in association with a photographic print made from the photographic film, typically a negative film. Typically, this indicia is printed either adjacent to the image on the front of the photographic print or on the reverse side of the photographic print. However, the task of printing frame indicia on prints from developed negative film, whether human readable or machine readable, (which typically utilizes latent image bar code information) is a fundamentally much different problem than the problem of printing a latent image identifying the frame number of the unexposed photographic film during manufacture.

In contrast, U.S. Pat. No. 5,294,950, DuVall et al, (Photo Control Corporation), discloses a system for solving an entirely different problem. DuVall et al discloses an automated film encoding and decoding system for bringing photographic film from the state of exposure to subject matter through all of the processes required to produce finished photos and package the same. The system includes an encoder operative with a camera for the placement of a human and machine readable code on the film at the time of exposure of the film including film frame identification, subject matter information and registration mark information. A decoder is capable of reading the code for the control of production processing equipment in laboratories provided with such equipment.

Since the film frame identification information is printed at the same time as exposure of the remainder of the associated film frame. Since a substantial period of time, usually several seconds or longer, occurs between exposures, a very slow imaging system can be used. Light emitting diodes and liquid crystal displays are entirely adequate for this purpose but are wholly inadequate for exposuring photographic film with high quality latent images during manufacture. Further, liquid crystal displays do not provide a degree of contrast high enough to be suitable for the printing of latent imaging frame identification data during the manufacture of photographic film. Since latent images fade with time, a low contrast bar code at the time of manufacture will deteriorate enough that when the film is eventually developed the bar code could be out of ANSI specification and be unreadable by a bar code reader. Therefore, systems designed with liquid crystal displays would result in an extremely slow system having poor quality.

SUMMARY OF THE INVENTION

The present invention overcomes many of the obstacles existing in previous systems designed to impart latent images to a strip of light sensitive film. The present invention uses a ferroelectric liquid crystal array (FLC array) which works as an electro-optical shutter for imaging the light sensitive material. With the FLC array designed with specific pixels, any latent image may be formed. The high speed light source enables very short exposure times, including exposure times of less than five microseconds, and even less than two microseconds in some applications. With the combination of the high speed light source and the FLC array, the image may be changed very quickly. This enables images which can be exposed less than one millisecond apart. Since the pixels in the FLC array can be changed quickly, e.g., in less than 35 microseconds, the pattern of pixels to be imaged on the light sensitive film can be changed on every exposure of the high speed light source. This allows for the exposures to easily occur within a millisecond or less spacing of each other. Further, the present invention enables the production of latent images with a contrast ratio of greater than 1000:1 producing the same quality as traditional pattern plate mask systems. The apparatus of the present invention is nearly color neutral enabling the use of traditional filters to easily obtain proper color balance. The image exposure is very homogeneous. Since the image for each frame and half-frame is simultaneously exposed, the exposure is uniform.

Besides the high speed and image quality, the apparatus of the present invention is relatively small along the axis of film travel. Since a whole frame is imaged at once, system timing is not complicated. This allows the FLC electronic controller's design to be simple.

Further, the apparatus of the present invention is relatively low in cost and is not nearly as complex and bulky as imaging systems based on light emitting diode and fiber bundle arrays.

In one embodiment, the present invention provides an apparatus for imparting a succession of predetermined machine readable latent images on a strip of unexposed light sensitive film having a series of frames, the succession of latent images being individually indicative each of the series of frames of the film. A light source is adapted to be controlled at a rate associated for a particular one of the type of the film, the light source produces imaging light to which the film is sensitive. A ferroelectric liquid crystal array receives the imaging light, the ferroelectric liquid crystal array having a plurality of segments, each of the plurality of segments being individually switchable between opaque and transparent, the plurality of segments being formed so that the apparatus can produce all of the predetermined latent images. Focusing means for focusing the imaging light which has passed through the ferroelectric liquid crystal array onto the strip of light sensitive film.

Preferably, the apparatus of the present invention further has a filter disposed between the light source and the ferroelectric liquid crystal array, the filter being capable of color matching the imaging light from the light source to the light sensitivity of the light sensitive film.

Preferably, the apparatus of the present invention further has a condensing lens disposed between the filter and the ferroelectric liquid crystal array, the condensing lens being capable of focusing the imaging light onto the ferroelectric liquid crystal array.

Preferably, the focusing means is a projection lens disposed in the optical path of the imaging light between the ferroelectric liquid crystal array and the light sensitive film.

Preferably, the plurality of segments of the ferroelectric liquid crystal array form a machine readable bar code indicative of an individual one of the series of frames.

Preferably, a first portion of the predetermined latent images represent information relating to a type of the light sensitive film and a second portion of the predetermined latent images represent information relating to the individual one of the series of frames.

Preferably, the apparatus of the present invention also has a switching means operatively coupled to the ferroelectric liquid crystal array for setting each of the plurality of segments to be either opaque or transparent.

In another embodiment, the present invention is a method for imparting a succession of predetermined machine readable latent images along at least one longitudinal side of a strip of unexposed light sensitive film having a series of frames, the succession of latent images being individually indicative each of the series of frames of the film. A light source adapted to be controlled at a rate associated for a particular one of the type of the film is strobed producing imaging light to which the film is sensitive. A ferroelectric liquid crystal array receives the imaging light, the ferroelectric liquid crystal array having a plurality of segments, each of the plurality of segments being individually switchable between opaque and transparent, the plurality of segments being formed so that the ferroelectric liquid crystal array can produce all of the predetermined latent images. The imaging light is focused onto the strip of light sensitive film.

Preferably, the method of the present invention filters the imaging light in order to color match the imaging light from the light source to the light sensitivity of the light sensitive film.

Preferably, the method of the present invention condenses the imaging light onto the ferroelectric liquid crystal array.

Preferably, the focusing step uses a projection lens disposed in the optical path of the imaging light between the ferroelectric liquid crystal array and the light sensitive film.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERRED EMBODIMENTS

Figure 1:
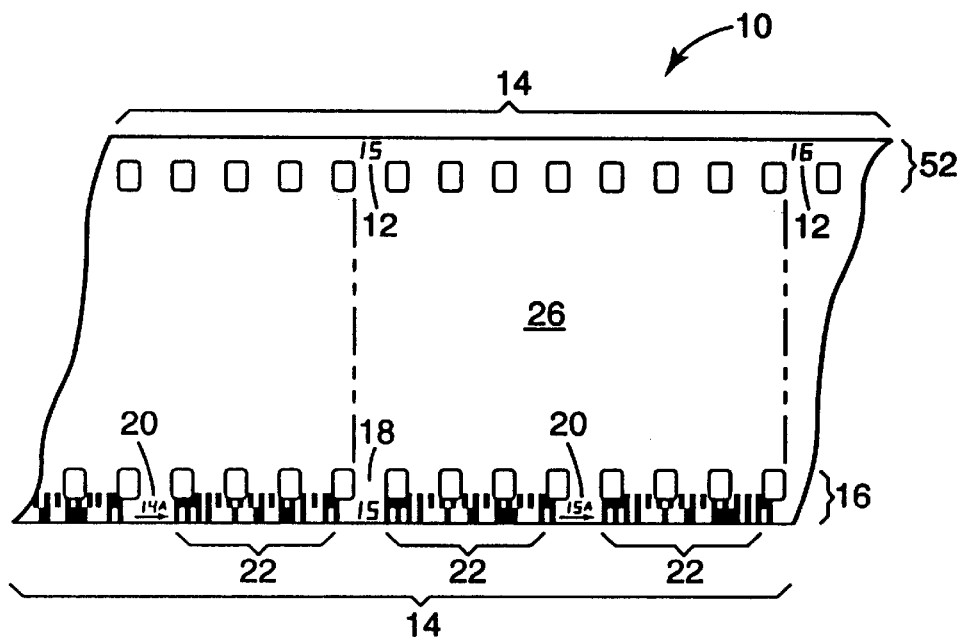
FIG. 1 illustrates latent images created in accordance with the present on standard Type 135 photographic film.

In the manufacture of photographic film, it is necessary to provide by means of latent images, a significant amount of information to the photofinisher and end user. Some of this information is human readable, for example, alphanumeric frame numbers and half frame numbers, manufacturer's name, film type and speed. Other of the information is strictly machine readable for the benefit of automated photofinishing equipment, for example, the DX bar code.

This latent information is provided by manufacturer of the photographic film during manufacturing process and is contained on the unexposed photographic film upon receipt by the user. The latent information is developed, along with any other image imparted to the photographic film during exposure by the user, during processing of the photographic film.

One type of latent image commonly placed on photographic film is a DX bar code. The DX bar code is located adjacent each full frame and half frame number along at least one side of a strip of light sensitive, photographic, film. It is a 23 bit dual track code which identifies the film manufacturer and film type.

The film is processed after it has been exposed by the user. Automated processing equipment develops the film using conventional techniques. After the film has been processed, automated printing equipment, using an appropriate code reader, can determine the film type and select the correct printing channel. A printing channel defines the filter settings of the printing machine. The filtering may be needed to provide correct color balance and is based on a particular film type and manufacturer.

Recently, the latent information imparted to light sensitive film has incorporated film frame number information. This information is useful when a customer reorders a print from a particular frame of the strip of light sensitive film. The customer specifies to the photofinisher which frame, or frames, of the strip of film should be reprinted. This can create a significant ambiguity, particularly when the customer is inexperienced.

In order to incorporate film frame number identification in the latent image, either a longer bar code may be used or the film frame number may be placed in a separate bar code. Kodak and Minnesota Mining and Manufacturing typically have chosen the former while Fuji has typically chosen the latter. The apparatus of the present invention could work equally well with either technique.

When a longer bar code, e.g., 31 bit, which includes frame number information within the bar code is used, the frame number of each individual print can then be automatically associated with each print at printing time. The 31 bit bar code incorporating frame number information is wider requiring greater positional tolerance versus adjacent frame numbers and requires that the bar code imparted change for each and every frame of the strip of photographic film. Actually, every bar code is different when using the 31 bit bar code, since the frame and half frame bar codes differ.

FIG. 1 illustrates a standard Type 135 (35 millimeter wide) photographic film 10 an implementation of a latent image 14 containing frame numbers 12 and 18, half frame numbers 20 and a 31 bit bar code. Note that the actual latent image 14 is imparted onto both longitudinal edges (16 and 52) of strip of photographic film 10. The actual latent image 14 is not visible until the strip of photographic film 10 is developed using conventional processing techniques. However, for purposes of illustration, strip of photographic film 10 illustrated in FIG. 1 shows latent image 14 in visible form as it would be following development of the strip of photographic film 10.

Latent image 14 is repeated the length of the strip of photographic film 10, only a portion of which is illustrated in FIG. 1. Latent image 14 consists of frame numbers (12 and 18), half-frame numbers 20 and bar codes 22. Bar codes 22 can be either 23 bits or 31 bits, or can be of any other acceptable length associated with a technique for imparting appropriate information about the film and/or its exposure. The two most common lengths and standard formats are either 23 bits or 31 bits in length. As noted above, the 23 bit bar code does not change along the length of the strip of photographic film 10. The 23 bit bar code is the same for a given film type and manufacturer. The 31 bit bar code changes twice for every frame 26 (once for every half frame) of strip of photographic film 10. Each 31 bit bar code is different.

Figure 2:
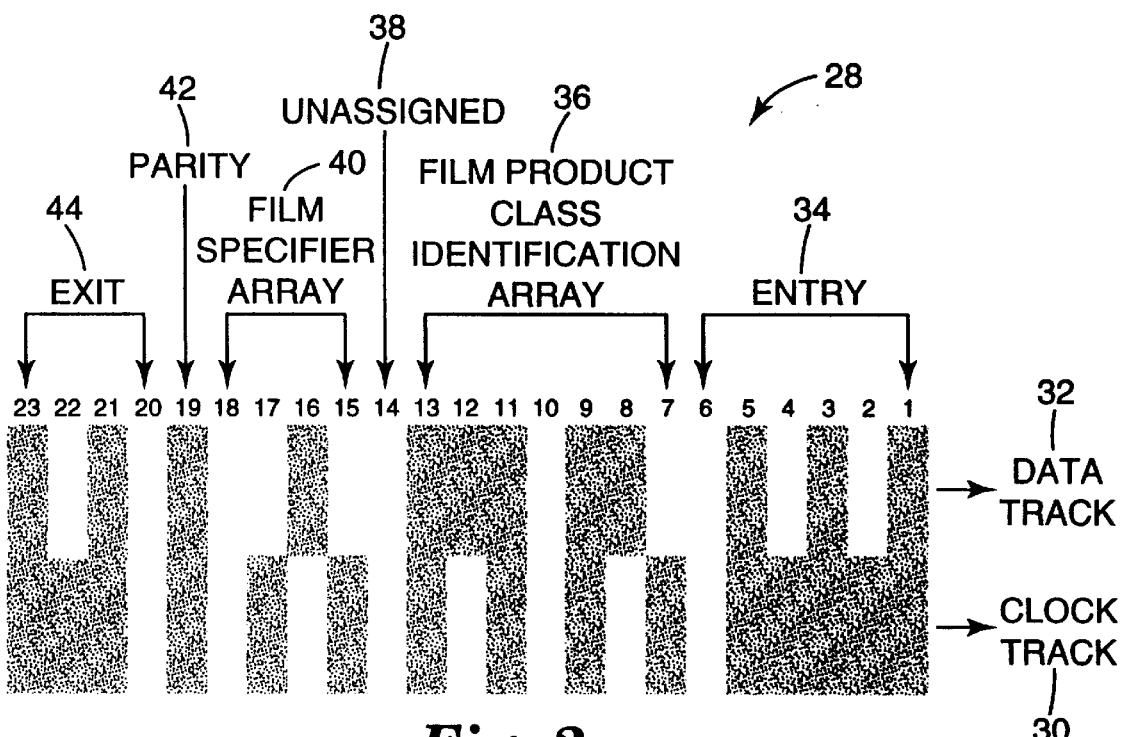
FIG. 2 illustrates the format of a standard 23 bit dual track bar code.

FIG. 2 illustrates the format of standard 23 bit dual track bar codes 28 which could be used for the latent image bar codes 22. Each bit of bar code 28 is formed with a clock track 30 and a data track 32. The first six bits 34 (bits 1–6) of bar code 28 represent an entry code. The next seven bits 36 (bits 7–13) identify the film product class. Bit 14 (reference numeral 38) is unassigned. The next four bits 40 (bits 15–18) identify the film specifier. Bit 19 (reference numeral 42) is a parity bit and the last four bits 44 (bits 20–23) represent an exit code.

Figure 3:
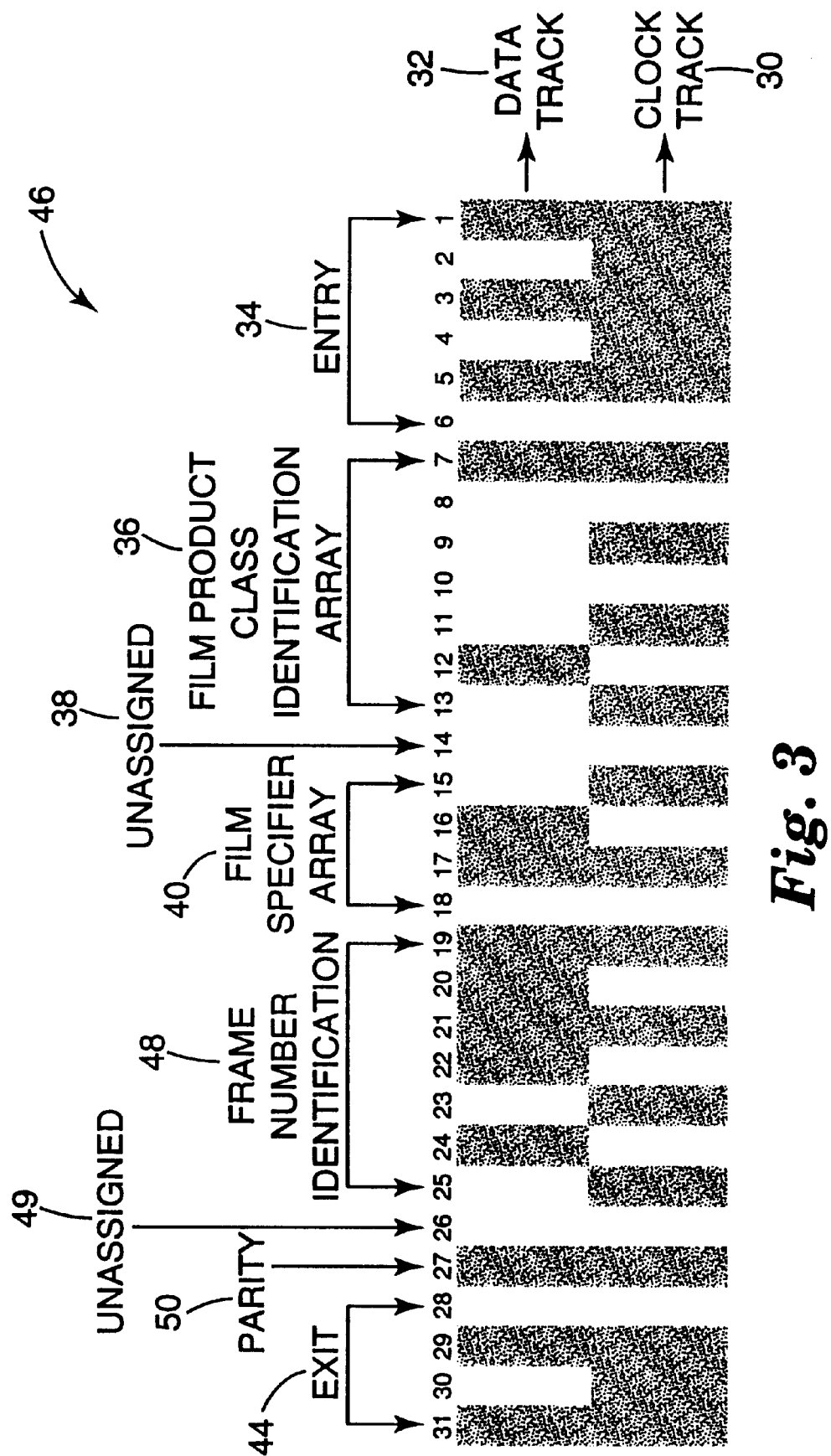
FIG. 3 illustrates the format of a standard 31 bit dual track bar code.

FIG. 3 illustrates the format of standard 31 bit dual track bar code 46 which is preferred as bar codes 22. Again, each bit of bar code 46 is formed with a clock track 30 and a data track 32. The first eighteen bits (34, 36, 38 and 40) are identical in format to the first eighteen bits (34, 36, 38 and 40) used in standard 23 bit bar code 28. Bits 1–6 (reference numeral 34) are entry bits, bits 7–13 (reference numeral 36) identify the film product class, bit 14 (reference numeral 38) is unassigned and bits 15–18 (reference numeral 40) identify the film specifier. Bits 19 through 27 (reference numerals 48 and 50) are not included in 23 bit bar code 28. Seven bits 48 (bits 19–25) identify the half frame number of each frame along the strip of photographic film 10. Bit 26 (reference numeral 49) is unassigned. The six most significant bits (bits 19–24) identify the frame number and the least significant bit (bit 25) identifies whether the bar code represents a frame or half frame. One bit 50 (bit 27) is a parity bit. The last four bits 44 (bits 28–31) represent the exit code as the last four bits 44 are so represented in 23 bit bar code 28.

Figure 4:
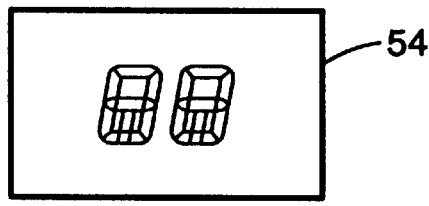
FIG. 4 illustrates diagrammatically the implementation of a two digit, twelve segment alphanumeric array.
Figure 5:
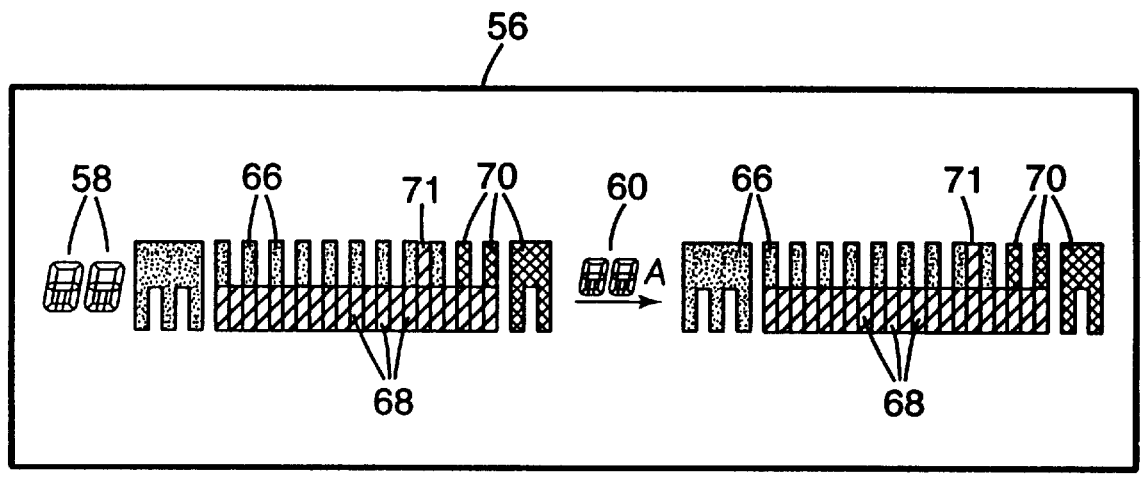
FIG. 5 illustrates diagrammatically another implementation of a two digit, twelve segment alphanumeric array.

In order to impart latent images 14 of both human readable alpha numeric frame numbers 12 along one edge 52 of strip of photographic film 10 as well as both human readable alpha numeric frame numbers 18 and half frame numbers 20 and machine readable bar codes 22 along the opposite edge 16 of the strip of photographic film 10, imaging units (54 and 56) are utilized in one embodiment of the present invention. FIG. 4 illustrates diagrammatically the implementation of two digit, twelve segment alphanumeric imaging unit 54. Imaging unit 54 is approximately 0.4 inches (1.0 centimeter) tall and 0.85 inches (2.2 centimeters) wide. Imaging unit 54 is constructed from several glass layers with chrome and indium tin oxide layers on glass, a ferroelectric liquid crystal material in the middle and a polarizer layer outside of this "glass sandwich". Imaging unit 54 is mounted in an aluminum housing approximately 1.125 inches (2.8 centimeters) tall, 2.5 inches (6.4 centimeters) wide and 0.8 inches (2 centimeters) thick. FIG. 5 illustrates imaging unit 56 which is used to create both human readable characters and machine readable bar codes along the opposite edge of the strip of photographic film 16. Two digit, twelve segment alpha numeric display area 58 which displays human readable frame numbers is similar to alphanumeric imaging unit 54. Imaging unit 56 is approximately 0.4 inches (1.0 centimeter) tall and 2 inches (5.08 centimeters) wide. Two digit, twelve segment alpha numeric display area 60 which displays human readable half frame numbers is also similar to display area 50, but somewhat reduced in size. Display area 60 is approximately 0.12 inches (0.3 centimeters) tall and 1.43 inches (3.63 centimeters) wide.

Bar codes 22 are formed using three separate displays areas (66, 68 and 70). The bottom portion of display areas 66, 68 and 70 represent the clock track of the bar code. The top portion of display area 66 has a solid bar that is five segments wide representing an entry code (bar code segment 34). The top portion of display area 66 is an alternating on/off pattern. The top portion of display area 70 is a bar that is three segments wide representing an exit code (bar code segment 44) and the additional clocking segments for the longer 31 bit bar code. The entry, exit and clocking track are always on for a frame 14 that has a bar code 22. Display area 70 is separately switchable off and lone switchable element 71 on the upper portion of display area 68 can be switched on to create an exit code for a 23 bit bar code. There are 13 data bars on the 23 bit bar code and 21 data bars on the 31 bit bar code which are represented by the lower portion of display area 68. The data which consists of the film manufacturer, film type, unassigned and parity bars is determined conventionally. In addition, the 31 bit bar code includes data to encode up to 64 frames and 64 half frames (128 bar codes) to display area 68 and are also determined conventionally. The data bits formed in the lower portion of display area 68 are the only data bits which are changed from frame to frame or film type to film type. Separate display areas 66 and 70 are switchable only to have the capability to break up entry, exit and clocking bars to accommodate either 23 bit or 31 bit bar code lengths.

Figure 6:
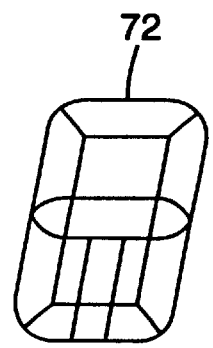
FIG. 6 illustrates the details of the format of a twelve segment digit.

The details format of twelve segment display area 72 used for both imaging unit 54 and display area 58 are illustrated in FIG. 6. Twelve segment display area 72 can be energized to display all ten numeric characters plus the letter "Y".

Figure 10:
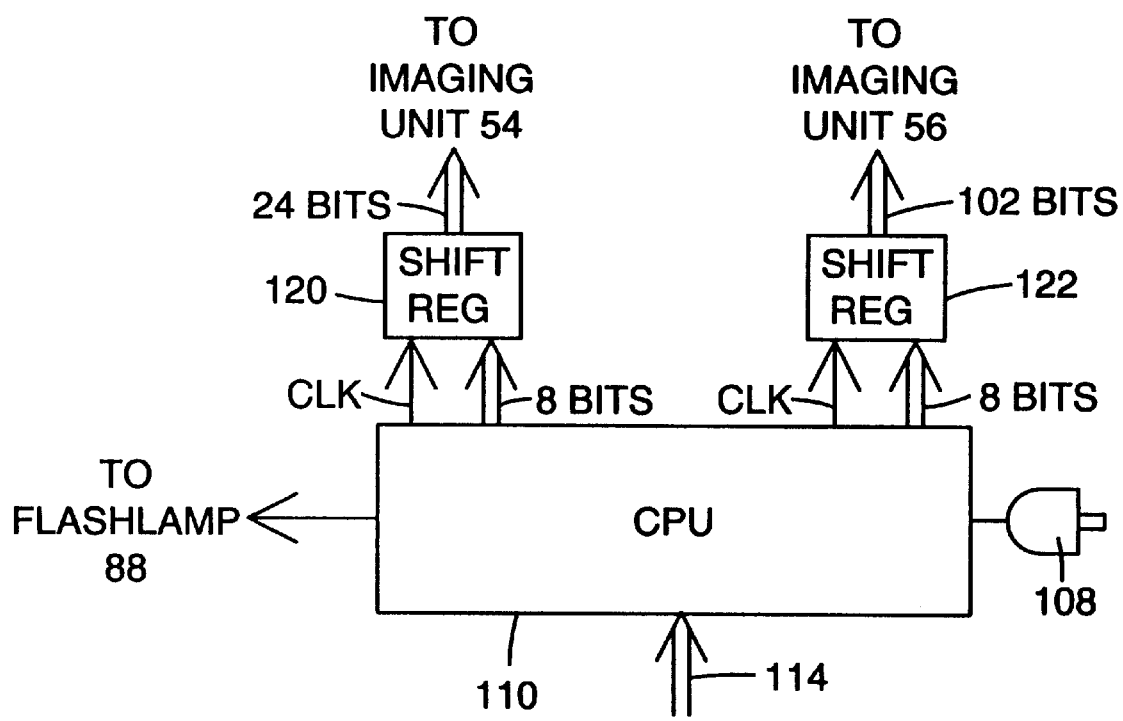
FIG. 10 illustrates a block diagram of the control system for the apparatus of the present invention.

Both imaging unit 54 and imaging unit 56 are coupled to shift register (120 in FIG. 10) and shift register (122 in FIG. 10), respectively, which are controlled by a central processing unit (110 in FIG. 10) which supplies information to determine which segments of imaging unit 54 and imaging unit 56 are energized depending upon the specific portion of latent image 14 to be generated on strip of photographic film 10. The specific portion of latent image 14 and the control of imaging unit 54 and imaging unit 56 to form such portion of latent image 14 are well known in the art.

Control of imaging unit 54 and imaging unit 56 is determined based upon an absolute position rotary encoder 108 which determines the exact position along strip of photographic film 10. This information is fed to central processing unit 110, illustrated in FIG. 10, which uses the position information to determine when to change the image on each of the imaging unit 54 and imaging unit 56. Central processing unit 110 allows the user via input 114 and output 116 to select the series of frame images that will be exposed and the number of images, the exposure count, e.g., 12, 24, 36 or any other integer up to and including 64. The series of frame images is denoted by the standard 23 bit or 31 bar codes. The manufacturer's code is set to either 66 or 85 for Minnesota Mining and Manufacturing Company, for example. Typical values for the manufacturer's code and film specifier are 66-6, 66-11 and 66-10 for ASA 100, ASA 200 and ASA 400 film manufactured by Minnesota Mining and Manufacturing Company. Imaging unit 54 has a total of 24 controllable pixels and imaging unit 56 has a total of 102 controllable pixels. Central processing unit 110 sends the information 8 bits at time to shift registers 120 and 122 which is operatively coupled to imaging unit 54 and imaging unit 56, respectively. Shift register 120, for imaging unit 54, is 24 bits. Shift register 122, for imaging unit 56, is 102 bits. Shift registers 120 and 122 take eight bits at a time until all bits (24 bits for imaging unit 54 and 102 bits for imaging unit 56) have been transmitted. Each bit represents a controllable pixel on the respective imaging unit 54 and 56. For example, to set pixels of imaging unit 56, shift register 122 has 102 outputs, one going to each controllable pixel. Central processing unit 110 sends bits 0–7 to shift register 122 and then toggles the clock input to shift register 122. Central processing unit 110 then sends bits 8–15 and toggles the clock input of shift register 122. This continues until all 102 bits have been loaded into shift register 122. At this point, the desired image has been identified to imaging unit 56. Once the last bit of information has been transferred into the shift register, the image on the FLC array will become stable after 80 microseconds. The exposure can then be made at any time.

After all pixels for both imaging unit 54 and imaging unit 56 have been sent, central processing unit 110 waits for an appropriate time, e.g., from 5–15 milliseconds depending upon the position of the film, to make the exposure of latent image 14 on photographic film 10 and then flashes strobe lamp 78. After strobe lamp 78 fires, the next frame of data is sent to imaging unit 54 and imaging unit 56 and the process continues. Central processing unit 110 keeps track of the position of strip of photographic film 10 and knows when to leave room for the tail/leader notch and starts the whole process over again.

Figure 7:
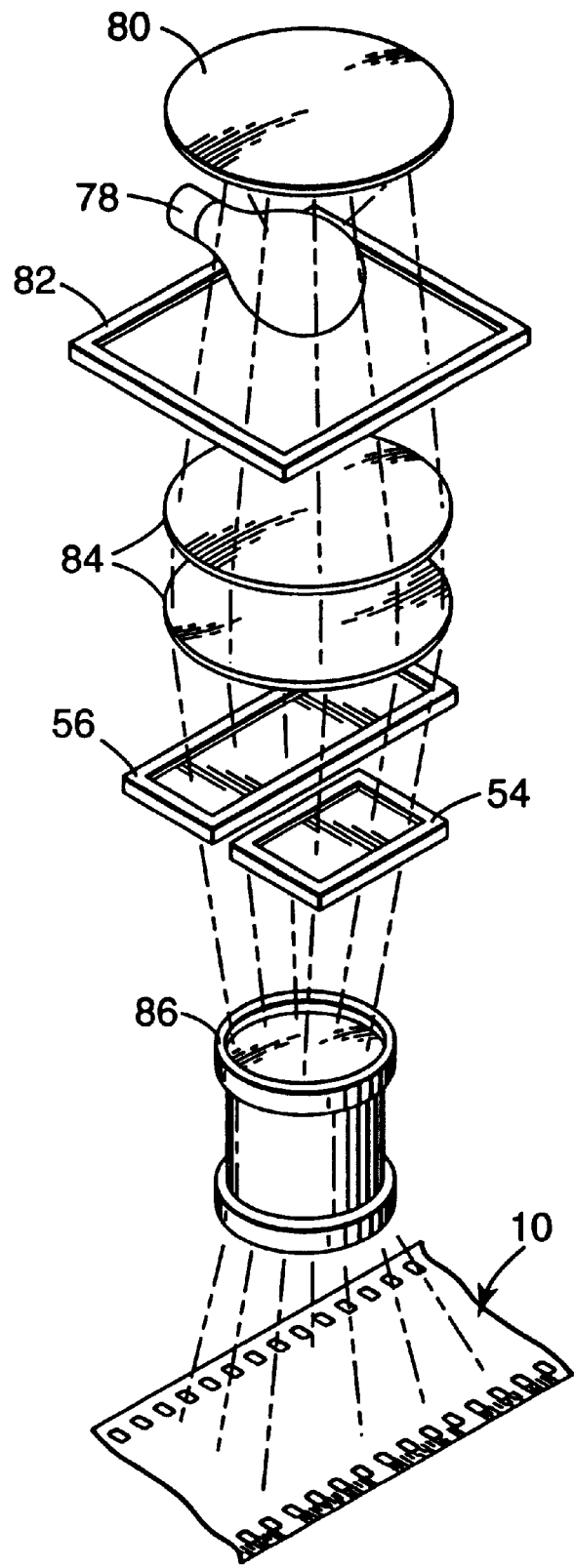
FIG. 7 schematically illustrates an apparatus for imparting latent images onto photographic film constructed in accordance with the present invention and using the imaging forming devices previously illustrated in FIGS. 4 and 5.
Figure 8:
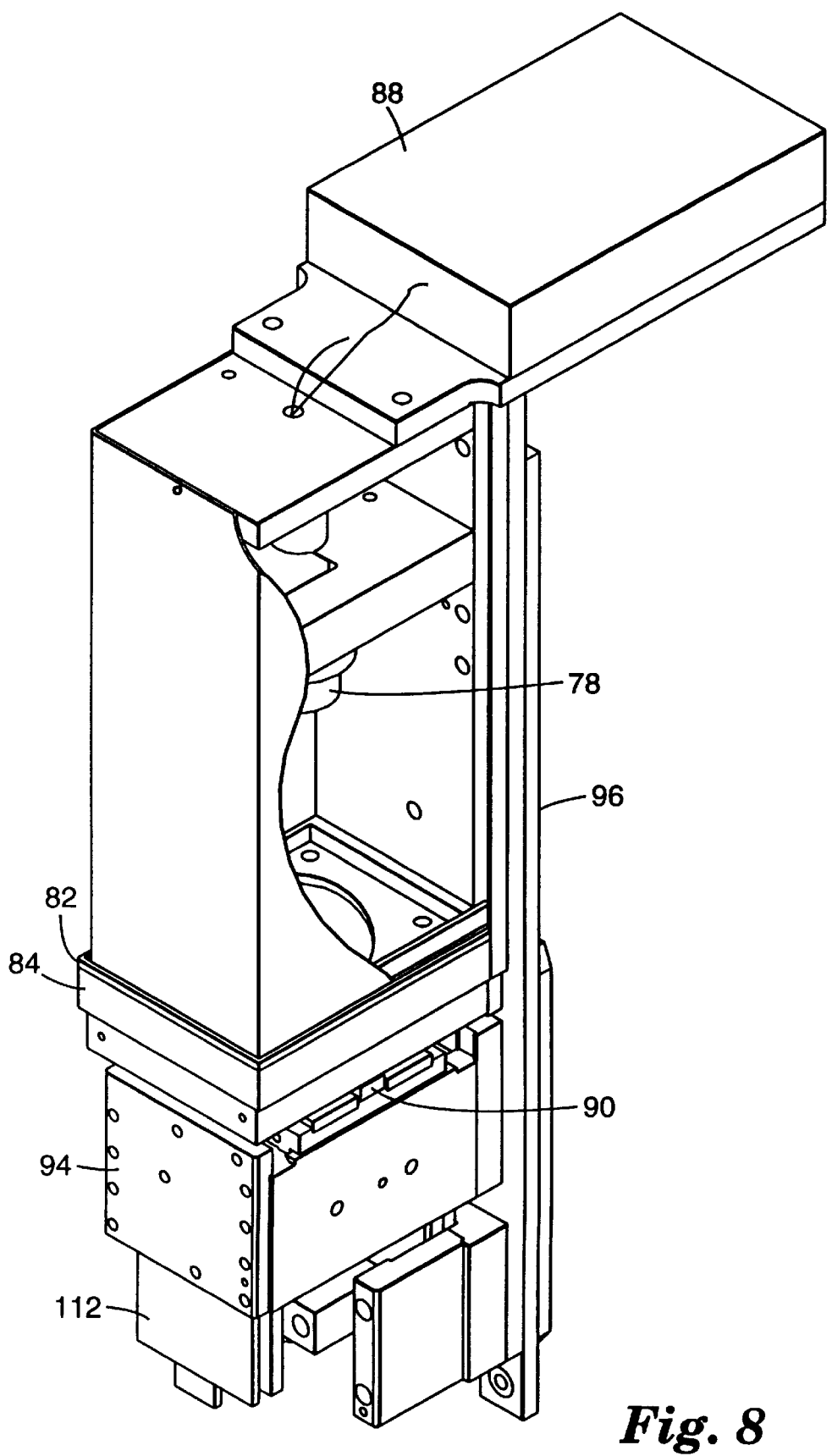
FIG. 8 illustrates a preferred embodiment of apparatus an apparatus for imparting latent images onto photographic film constructed in accordance with the present invention.
Figure 9:
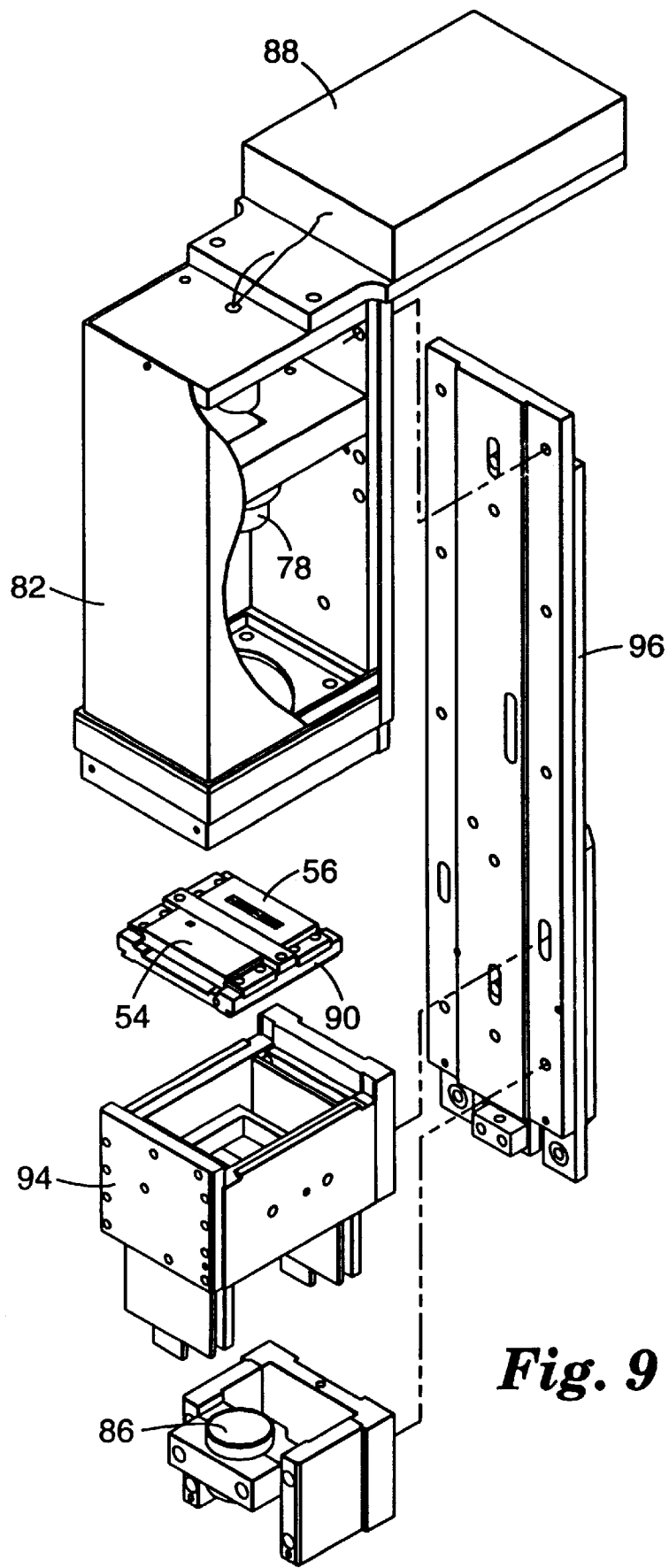
FIG. 9 illustrates the apparatus of FIG. 8 in exploded format.

Details of the construction of apparatus 74 can be seen in FIG. 7 which schematically illustrates apparatus 74 for imparting the latent images 12 and 14 to the strip of photographic film 10, in FIG. 8 which illustrates a preferred embodiment of apparatus 74 and in FIG. 9 which illustrates the preferred embodiment of FIG. 7 in exploded format. Imaging light 76 from strobe lamp 78, which is powered by power supply 88, is directed toward an optical path containing strip of photographic film 10. Preferably strobe lamp 78 is a xenon strobe, preferably an EG&G model FX1150 1.5 millimeter short arc xenon flashlamp, manufactured by EG&G Electro-Optics, 35 Congress Street, Salem, Mass., mounted into an EG&G model FYD1150A Lite-Pac that is driven by an EG&G model PS450 40 watt power supply 88. Imaging light 76 passes through filter pack 82 on its way toward photographic film 10. Filter pack 82, a holder for approximately 3.5 inch by 4 inch glass or cellophane commercially available filters, is used to provide the proper color density, according to well known techniques for the specific type of strip of photographic film 10. An ultraviolet filter is used specifically to protect imaging unit 54 and imaging unit 56 but other filters can be used to provide the desired color on photographic film 10. Since the ferroelectric liquid crystal arrays of imaging unit 54 and imaging unit 56 are fairly neutral across the visible light spectrum, filters can be used if, for example, the desired exposure is red only.

Condensing lens 84 focuses imaging light 76 onto imaging unit 54 and imaging unit 56. Both imaging unit 54 and imaging unit 56 are ferroelectric liquid crystal arrays formed as previously described with respect to FIGS. 4 and 5. The ferroelectric liquid crystal arrays mechanically held in housing 90 disposed in the optical path of imaging light 76 from strobe lamp 78 act as optical shutters to form the specific latent image 14 on strip of photographic film 10. Both imaging unit 54 and imaging unit 56 are attached to a black aluminum housing 94 which is warmed slightly above room temperature, thus stabilizing the temperature of imaging unit 54 and imaging unit 56 allowing a contrast ratio in excess of 1,000:1.

Imaging unit 54 and imaging unit 56 are both liquid crystal displays using a ferroelectric (FE) liquid crystal material. The ferroelectric liquid crystal arrays are very similar to liquid crystal arrays. However, a ferroelectric liquid crystal array is constructed of two pieces of glass with the FLC array liquid metal between the glass layers. The image is formed in a clear metal, preferably indium tin oxide. Other areas of the glass are masked off by chrome to give a sharp edge to the indium tin oxide. Polarizers are placed on the outside surfaces of the glass to control the polarization of the light which passes through the array. One piece of glass hangs over the other piece of glass and indium tin oxide lands are provide to allow connection to shift registers via a flexible heat bonded connector. The ferroelectric liquid crystals are particularly useful due to their bistable characteristics, fast switching times, and good contrast in large area displays. Ferroelectric liquid crystals are comprised -of molecules having a polarization vector that aligns with an applied electric field. Thus, the application of an electric field ("field-on condition") causes these liquid crystal molecules to orient in a characteristic way. Because they are bistable materials, they remain as oriented by the field even after the orienting electric field is removed ("field-off condition") thereby reducing power consumption. Application of a field of different polarity can re-orient the liquid crystal materials to a different orientation characteristic of the field. Because the liquid crystals affect light differently in different orientations, they can be made to effectively switch picture elements (pixels) in a display device on and off to display information as is well known in the art. Ferroelectric liquid crystal materials and display devices are described in U.S. Pat. No. 4,367,924, entitled "Chiral Smectic C or H Liquid Crystal Electro-Optical Device" and U.S. Pat. No. 4,563,059, entitled "Surface Stabilized Ferroelectric Liquid Crystal Devices", both of which are hereby incorporated by reference.

After passing through imaging unit 54 and imaging unit 56, imaging light 76 is formed to the specific latent image to be imparted on strip of photographic film 10. Projection lens 86 is selected conventionally based on the focal distance and the size of the image being viewed. Projection lens 86 projects such imaging light 76 onto the proper position of strip of photographic film 10. Strobe lamp 78, power supply 88, filter pack 82, imaging unit 54, imaging unit 56, housing 90, heated plate 94, shift registers 112 and projection lens 86 are all conveniently mounted on back plate 96.

While the present invention has been described with respect to it preferred embodiments, it is to be recognized and understood that changes, modifications and alterations in the form and in the details may be made without departing from the scope of the following claims.

What is claimed is:

1. An apparatus for imparting a succession of predetermined latent images on a strip of unexposed light sensitive film having a series of frames, said succession of latent images being individually indicative each of said series of frames of said film, comprising:

a light source adapted to be controlled at a rate associated for a particular one of said type of said film, said light source producing imaging light to which said film is sensitive;

a ferroelectric liquid crystal array receiving said imaging light, said ferroelectric liquid crystal array having a plurality of segments, each of said plurality of segments being individually switchable between opaque and transparent, said plurality of segments being formed so that said ferroelectric liquid crystal array can produce said predetermined latent images;

focusing means for focusing said imaging light which has passed through said ferroelectric liquid crystal array onto said strip of light sensitive film.

2. An apparatus as in claim 1 which further comprises a filter disposed between said light source and said ferroelectric liquid crystal array, said filter being capable of color matching said imaging light from said light source to the light sensitivity of said light sensitive film.

3. An apparatus as in claim 2 which further comprises a condensing lens disposed between said filter and said ferroelectric liquid crystal array, said condensing lens capable of focusing said imaging light onto said ferroelectric liquid crystal array.

4. An apparatus as in claim 3 wherein said focusing means comprises a projection lens disposed in the optical path of said imaging light between said ferroelectric liquid crystal array and said light sensitive film.

5. An apparatus as in claim 1 wherein said plurality of segments of said ferroelectric liquid crystal array form a machine readable bar code indicative of an individual one of said series of frames.

6. An apparatus as in claim 5 wherein a first portion of said predetermined latent images represent information relating to a type of said light sensitive film and wherein a second portion of said predetermined latent images represent information relating to said individual one of said series of frames.

7. An apparatus as in claim 1 wherein said light source has an exposure time of not more than five microseconds.

8. An apparatus as in claim 1 which further comprises switching means operatively coupled to said ferroelectric liquid crystal array for setting each of said plurality of segments to be opaque or transparent.

9. A method for imparting a succession of predetermined latent images on a strip of unexposed light sensitive film having a series of frames, said succession of latent images being individually indicative each of said series of frames of said film, comprising:

strobing a light source adapted to be controlled at a rate associated for a particular one of said type of said film, said light source producing imaging light to which said film is sensitive;

setting a ferroelectric liquid crystal array receiving said imaging light, said ferroelectric liquid crystal array having a plurality of segments, each of said plurality of segments being individually switchable between opaque and transparent, said plurality of segments being formed so that said ferroelectric liquid crystal array can produce all of said predetermined latent images; and focusing said imaging light which has passed through said ferroelectric liquid crystal array onto said strip of light sensitive film.

10. A method as in claim 9 which further comprises filtering said imaging light in order to color match said imaging light from said light source to the light sensitivity of said light sensitive film.

11. A method as in claim 10 which further comprises condensing said imaging light onto said ferroelectric liquid crystal array.

12. A method as in claim 11 wherein said focusing step uses a projection lens disposed in the optical path of said imaging light between said ferroelectric liquid crystal array and said light sensitive film.

13. A method as in claim 9 wherein said plurality of segments of said ferroelectric liquid crystal array form a machine readable bar code indicative of an individual one of said series of frames.

14. A method as in claim 13 wherein a first portion of said predetermined latent images represent information relating to a type of said light sensitive film and wherein a second portion of said predetermined latent images represent information relating to said individual one of said series of frames.

15. A method as in claim 9 wherein said strobing step has an exposure time of not more than five microseconds.

16. A method as in claim 9 which further comprises the step of setting each of said plurality of segments to be opaque or transparent.

* * * * *